United States Patent
Moeller et al.

(10) Patent No.: US 9,815,980 B2
(45) Date of Patent: Nov. 14, 2017

(54) POLYESTER MOLDING COMPOUNDS WITH LOW TOC EMISSION

(71) Applicant: BASF SE, Ludwigshafen (DE)

(72) Inventors: Anna Karina Moeller, Darmstadt (DE); Simon Kniesel, Weinheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/894,543

(22) PCT Filed: May 27, 2014

(86) PCT No.: PCT/EP2014/060877
§ 371 (c)(1),
(2) Date: Nov. 30, 2015

(87) PCT Pub. No.: WO2014/195176
PCT Pub. Date: Dec. 11, 2014

(65) Prior Publication Data
US 2016/0122530 A1    May 5, 2016

(30) Foreign Application Priority Data
Jun. 7, 2013 (EP) .................................. 13170969

(51) Int. Cl.
*C08L 67/02* (2006.01)
(52) U.S. Cl.
CPC ........... *C08L 67/02* (2013.01); *C08L 2205/06* (2013.01)
(58) Field of Classification Search
CPC ....... C08L 33/02; C08L 67/02; C08L 2205/06
See application file for complete search history.

(56) References Cited

U.S. PATENT DOCUMENTS 6,114,495 A    9/2000 Kolstad et al.
2007/0225475 A1    9/2007 Peacock et al.

FOREIGN PATENT DOCUMENTS

DE    10 2009 020 211 A1    11/2010
EP    683 201 A1    11/1995
EP    2 427 511 A1    3/2012

OTHER PUBLICATIONS

Braun, D.B., et al.; Rheology Modifiers Handbook: Practical Use and Application, 1999, p. 86.*
International Search Report in International Patent Application No. PCT/EP2014/060877, dated Jul. 21, 2014 (English translation).

* cited by examiner

Primary Examiner — Robert Jones, Jr.
(74) Attorney, Agent, or Firm — Marshall, Gerstein & Borun LLP

(57) ABSTRACT

1. Thermoplastic molding composition comprising
A) from 30 to 99.99% by weight of a polyester composed of from 50 to 100% by weight of at least one polyalkylene terephthalate A1), based on A), and from 0 to 50% by weight of a polyester A2), differing from A1),
B) from 0.01 to 2% by weight of an acrylic acid polymer, composed of
B1) from 70 to 100% by weight of acrylic acid,
B2) from 0 to 30% by weight of at least one other ethylenically unsaturated monomer copolymerizable with acrylic acid, selected from the group of monoethylenically unsaturated carboxylic acids, and
C) from 0 to 70% by weight of other additional substances, where the total of the percentages by weight of components A) to C) is 100%.

17 Claims, No Drawings

POLYESTER MOLDING COMPOUNDS WITH LOW TOC EMISSION

CROSS-REFERENCE TO RELATED APPLICATIONS

This is the U.S. national phase of International Application No. PCT/EP2014/060877, filed May 27, 2014, which claims the benefit of European Patent application No. 13170969.3, filed Jun. 7, 2013.

The invention relates to thermoplastic molding compositions comprising

A) from 30 to 99.99% by weight of a polyester composed of from 50 to 100% by weight of at least one polyalkylene terephthalate A1), based on A), and from 0 to 50% by weight of a polyester A2), differing from A1), B) from 0.01 to 2% by weight of an acrylic acid polymer, composed of B1) from 70 to 100% by weight of acrylic acid, B2) from 0 to 30% by weight of at least one other ethylenically unsaturated monomer copolymerizable with acrylic acid, selected from the group of monoethylenically unsaturated carboxylic acids, and C) from 0 to 70% by weight of other additional substances, where the total of the percentages by weight of components A) to C) is 100%.

The invention further relates to the use of the molding compositions of the invention for the production of moldings of any type, in particular with TOC emission smaller than or equal to 100 ppm, and to the moldings thus obtainable, preferably with TOC emission smaller than or equal to 100 ppm.

Polyesters, in particular polyalkylene terephthalates, or polymers having units of this type, and also blends with polyalkylene terephthalates of this type, are produced via polymerization of the corresponding monomers for example in the presence of titanium catalyst. After the polymerization reaction has concluded, the (titanium)catalyst is still present in reactive form within the system, and during any subsequent processing of the polymer (particularly in the molten state, e.g. during extrusion or injection molding) can therefore decompose the polymer to give products that are gaseous or that sublime. Depolymerization processes of this type take place in particular when polyesters are kept for long periods in the melt or are processed under extreme conditions (high temperature, high pressure, high shear, or the like). To the extent that the decomposition products are not emitted immediately, they can also be accumulated within the PBT and emitted at a subsequent juncture. By way of example, pellets or PBT injection moldings can emit organic compounds when they are used at elevated temperature. This is the case in many electrical and electronic applications in which polyesters are used in relays, switches, or plugs, and also in applications in automobile interiors, or in packaging for food or drink or in cosmetics packaging. Emission of the decomposition products should be reduced for many applications because the compounds emitted can lead to undesired odors or to alteration of taste and are sometimes irritant or hazardous to health. There are strict guidelines in particular for the use in automobile interiors or in contact with food or drink. The products emitted are mostly volatile organic compounds (VOCs), in particular tetrahydrofuran (THF), which accounts for 98%, and also butadiene, acetaldehyde, furan, acrolein, methanol, 1-buten-4-ol, and other THF derivatives.

The following additives have been used in the prior art to reduce emission from polyesters:

EP-A 683 201 Addition of a sulfonic acid component during polymerization, these being classified as hazardous-to-health or carcinogenic.

US 2007/225475 Addition of a P-containing component to deactivate the titanium catalyst. The emission values stated here are percentages, i.e. are not absolute values, and are not fully satisfactory.

EP-A-2427 511 Addition of a chain extender based on epoxidized styrene-acrylic polymer which also leads to an undesired molecular weight increase, but this method can reduce amounts of oligomers or solvent residues.

U.S. Pat. No. 6,114,495 Addition of polyacrylic acid to polyesters based on lactic acid during polymerization to deactivate the Sn catalysts or Sb catalysts.

DE-A 102009020211 discloses the addition of a styrene-acrylic polymer (e.g., Joncryl®), which is used at concentrations of 0.01 to 2% in order to reduce the level of extractable compounds in PBT.

Joncryl® ADR-4368 is a solid, oligomeric chain extender based on an epoxy-functionalized styrene-acrylic acid polymer. The polymer is reactive in polyesters and is used customarily in order to increase the molecular weight of the polymers and hence the intrinsic viscosity and melt viscosity of the polymers.

But using epoxidized styrene-acrylic acid copolymers results in a chain extension and increase in the molecular weight. The increase in the molecular weight is associated with a rise in the melt viscosity and/or with a reduction in the fluidity, this being disadvantageous for numerous (injection molding) applications.

It is therefore an object of the present invention to provide polyester molding compositions having at least 50% by weight of alkylene terephthalate units which exhibit reduced TOC (total organic carbon) emission and are more resistant to decomposition during processing. An increase in molecular weight during processing is likewise undesirable.

Accordingly, the molding compositions defined in the introduction have been found. Preferred embodiments are provided in the dependent claims.

The molding compositions of the invention comprise, as component (A), from 30 to 99.99% by weight, preferably from 35 to 99% by weight, and in particular from 35 to 85% by weight, of a thermoplastic polyester composed of from 50 to 100% by weight, in particular from 60 to 100% by weight, of a polyalkylene terephthalate A1) (based on 100% by weight of A) and from 0 to 50% by weight, preferably from 0 to 40% by weight, of a polyester A2) differing from A1).

Said quantitative proportion is intended to include blends of polyalkylene terephthalates with polyesters and also copolyesters which comprise at least 50% by weight of alkylene terephthalate units.

A first group of preferred polyesters A1) is provided by polyalkylene terephthalates having from 2 to 10 carbon atoms in the alcohol moiety.

Polyalkylene terephthalates of this type are known per se and are described in the literature. Their main chain comprises an aromatic ring which derives from the aromatic dicarboxylic acid. The aromatic ring can also have substitution, e.g. by halogen, such as chlorine and bromine, or by $C_1$-$C_4$-alkyl groups, such as methyl, ethyl, isopropyl, n-propyl, and n-butyl, isobutyl or tert-butyl groups.

These polyalkylene terephthalates can be produced in a manner known per se via reaction of aromatic dicarboxylic acids, or their esters or other ester-forming derivatives, with aliphatic dihydroxy compounds.

A portion of the terephthalic acid, up to 30 mol %, can by way of example be replaced by 2,6-naphthalenedicarboxylic acid, or isophthalic acid, or a mixture of these. Up to 70 mol %, preferably not more than 10 mol %, of the aromatic dicarboxylic acids can be replaced by aliphatic or cycloaliphatic dicarboxylic acids, such as adipic acid, azelaic acid, sebacic acid, dodecanedioic acids, and cyclohexanedicarboxylic acids.

Among the aliphatic dihydroxy compounds, preference is given to diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol, and neopentyl glycol, and mixtures of these.

Particularly preferred polyalkylene terephthalates derive from alkanediols having from 2 to 6 carbon atoms. Among these, preference is in particular given to polyethylene terephthalate, polypropylene terephthalate, and polybutylene terephthalate, and mixtures of these. Preference is further given to PET and/or PBT which comprise up to 1% by weight, preferably up to 0.75% by weight, of 1,6-hexanediol and/or 2-methyl-1,5-pentanediol as other monomer units.

The intrinsic viscosity of the polyesters (A) is generally in the range from 50 to 220, preferably from 80 to 160 (measured in 0.5% by weight solution in a phenol/o-dichlorobenzene mixture (ratio by weight 1:1 at 25° C.) in accordance with ISO 1628).

Preference is in particular given to those having terminal carboxy group content up to 100 meq/kg of polyester, preferably up to 50 meq/kg of polyester, and in particular up to 40 meq/kg of polyester. Polyesters of this type can by way of example be produced by the process of DE-A 44 01 055. Terminal carboxy group content is usually determined by titration methods (e.g. potentiometry).

Particularly preferred polyalkylene terephthalates are produced with Ti catalysts. Residual Ti content of these after the polymerization process is less than or equal to 250 ppm, in particular less than 200 ppm, particularly preferably less than 150 ppm.

Another group that may be mentioned is that of fully aromatic polyesters which derive from aromatic dicarboxylic acids and from aromatic dihydroxy compounds, and which can be present in a mixture or constituent of the repeating units with the polyalkylene terephthalates.

Suitable aromatic dicarboxylic acids are the compounds described above for the polyalkylene terephthalates. It is preferable to use mixtures of from 5 to 100 mol % of isophthalic acid and from 0 to 95 mol % of terephthalic acid, in particular mixtures of about 80% to 50% of terephthalic acid with 20% to 50% of isophthalic acid.

The aromatic dihydroxy compounds preferably have the general formula

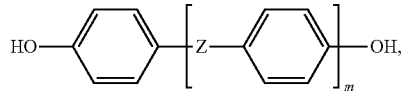

in which Z is an alkylene or cycloalkylene group having up to 8 carbon atoms, an arylene group having up to 12 carbon atoms, a carbonyl group, a sulfonyl group, an oxygen atom, or a sulfur atom, or a chemical bond, and in which the value of m is from 0 to 2. The compounds can also bear $C_1$-$C_6$-alkyl or alkoxy groups and fluorine, chlorine, or bromine as substituents on the phenylene groups.

Examples of parent compounds for these compounds are dihydroxybiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
di(hydroxyphenyl) sulfone, di(hydroxybenzoyl)benzene, resorcinol, and hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

In the invention, the term polyester includes halogen-free polycarbonates. Examples of suitable halogen-free polycarbonates are those based on biphenols of the general formula

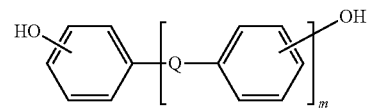

in which Q is a single bond, a $C_1$-$C_8$-alkylene group, a $C_2$-$C_3$-alkylidene group, a $C_3$-$C_6$-cyclo-alkylidene group, a $C_6$-$C_{12}$-arylene group, or else —O—, —S— or —$SO_2$—, and m is an integer from 0 to 2.

The phenylene radicals of the biphenols may also have substituents, such as $C_1$-$C_6$-alkyl or $C_1$-$C_6$-alkoxy.

Examples of preferred biphenols of this formula are hydroquinone, resorcinol, 4,4'-dihydroxy-diphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)-propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically and preferably by incorporating from 0.05 to 2.0 mol %, based on the total of the biphenols used, of at least trifunctional compounds, for example those having three or more phenolic OH groups. Polycarbonates which have proven particularly suitable have relative viscosities $n_{rel}$ of from 1.10 to 1.50, in particular from 1.25 to 1.40. This corresponds to an average molar mass $M_w$ (weight average) of from 10 000 to 200 000 g/mol, preferably from 20 000 to 80 000 g/mol.

The biphenols of the general formula are known per se or can be produced by known processes.

The polycarbonates may, for example, be produced by reacting the biphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782.)

Examples of suitable chain terminators are phenol, p-tert-butylphenol, or else long-chain alkylphenols, such as 4-(1, 3-tetramethylbutyl)phenol, as in DE-A 28 42 005, or monoalkylphenols, or dialkylphenols with a total of from 8 to 20 carbon atoms in the alkyl substituents, as in DE-A 35 06 472, such as p-nonylphenol, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates made from halogen-free biphenols, from halogen-free chain terminators and optionally from halogen-free branching agents, where the content of subordinate amounts at the ppm level of hydrolyzable chlorine, resulting, for example, from the production of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention. Other suitable components A) which may be mentioned are amorphous polyester carbonates, where phosgene has been replaced, during the preparation, by aromatic dicarboxylic acid units, such as isophthalic acid and/or terephthalic acid units. For further details reference may be made at this point to EP-A 711 810.

Other suitable copolycarbonates having cycloalkyl radicals as monomer units have been described in EP-A 365 916.

Bisphenol A can moreover be replaced by bisphenol TMC. Polycarbonates of this type are obtainable with trademark APEC HT® from Bayer.

The molding compositions of the invention comprise, as component B), from 0.01 to 2% by weight, preferably from 0.05 to 1.5% by weight, and in particular from 0.1 to 1% by weight, of an acrylic acid polymer.

These are composed of

B1) from 70 to 100% by weight, preferably from 85 to 100% by weight, of acrylic acid, B2) from 0 to 30% by weight, preferably up to 15% by weight, of at least one other ethylenically unsaturated monomer copolymerizable with acrylic acid, selected from the group of monoethylenically unsaturated carboxylic acids, where the total of the percentages by weight of B1) and B2) is 100%.

Preferred suitable monomers for copolymers are monoethylenically unsaturated carboxylic acids, such as methacrylic acid, maleic acid, fumaric acid, itaconic acid, mesaconic acid, methylenemalonic acid, and citraconic acid or a mixture of these.

Equally, forms in which the abovementioned monomers comprising acid groups can be used in the polymerization reaction are that of the free acids or that of salts, e.g. the sodium salts, potassium salts, or ammonium salts.

The molar mass of the acrylic acid polymers of the invention is generally from 1000 to 100 000 g/mol ($M_w$=weight-average molar mass).

It is preferable that the weight-average molar mass of the acrylic acid polymer is from 1000 to 12 000 g/mol, preferably from 1500 to 8000 g/mol, and particularly preferably from 3500 to 6500 g/mol. The molar mass can be adjusted in a controlled manner within said ranges via the amount of regulator used.

The proportion of polymers with molar mass <1000 g/mol is generally ≤10% by weight, preferably ≤5% by weight, based on the entire polymer.

The molar masses are determined by means of GPC on aqueous solutions of the polymers buffered to pH 7, using a hydroxyethyl methacrylate copolymer network as stationary phase and using sodium polyacrylate standards.

The polydispersity index of the acrylic acid polymer $M_w/M_n$ is generally ≤2.5, preferably from 1.5 to 2.5, for example 2.

The K values, determined by the Fikentscher method on a 1% by weight solution in deionized water, are generally from 10 to 50, preferably from 15 to 35, and particularly preferably from 20 to 30.

In order to produce low-molecular-weight polyacrylic acids, molecular-weight regulators or chain-transfer agents are added during the free-radical polymerization of acrylic acid. Said regulators must be appropriate to the polymerization initiator, and also to the polymerization process. Examples of known initiators are inorganic and organic percompounds, such as peroxodisulfates, peroxides, hydroperoxides, and peresters, azo compounds, such as 2,2'-azobisisobutyronitrile, and redox systems with inorganic and organic components. Regulators used often comprise inorganic sulfur compounds, such as hydrogensulfites, disulfites, and dithionites, organic sulfides, sulfoxides, sulfones, and mercapto compounds, such as mercaptoethanol, mercaptoacetic acid, and also inorganic phosphorus compounds, such as hypophosphorous acid (phosphinic acid), and salts thereof (e.g. sodium hypophosphite).

Processes for the production of acrylic acid polymers of this type are known by way of example from DE-A-19950941, and WO-A 2012/104401.

The pH of particularly preferred acrylic acid polymers is less than 4, in particular smaller than 3 i.e. the acrylic acid polymers used are preferably polymers that have been only partially neutralized or that have not been neutralized at all, i.e. either free acid groups are present or acid groups are present that have been neutralized only partially with alkali metal ions.

The molding compositions of the invention can comprise, as component C), from 0 to 70% by weight, in particular up to 50% by weight, of other additional substances and processing aids, where these differ from B) and/or from A), based on 100% by weight of A), B), and C).

Examples of conventional additional substances C) are amounts of up to 40% by weight, preferably up to 15% by weight, of elastomeric polymers (often also termed impact modifiers, elastomers, or rubbers).

These very generally involve copolymers, which are preferably composed of at least two of the following monomers: ethylene, propylene, butadiene, isobutene, isoprene, chloroprene, vinyl acetate, styrene, acrylonitrile, and acrylates and, respectively, methacrylates having from 1 to 18 carbon atoms in the alcohol component.

Polymers of this type are described, for example, in Houben-Weyl, Methoden der organischen Chemie, Vol. 14/1 (Georg Thieme Verlag, Stuttgart, Germany, 1961), pages 392-406, and in the monograph by C. B. Bucknall, "Toughened Plastics" (Applied Science Publishers, London, 1977).

Some preferred types of such elastomers are described below.

Preferred types of elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, or a mixture of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl(meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formula I, II, III or IV

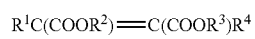

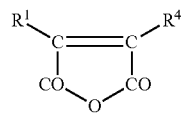

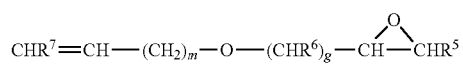

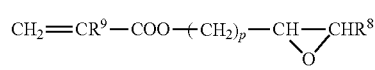

where $R^1$ to $R^9$ are hydrogen or alkyl groups having from 1 to 6 carbon atoms, and m is an integer from 0 to 20, g is an integer from 0 to 10 and p is an integer from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Comonomers which may also be used alongside these are vinyl esters and vinyl ethers.

The ethylene copolymers described above may be produced by processes known per se, preferably by random copolymerization at high pressure and elevated temperature. Appropriate processes are well known.

Other preferred elastomers are emulsion polymers whose production is described, for example, by Blackley in the monograph "Emulsion polymerization". The emulsifiers and catalysts which can be used are known per se.

In principle it is possible to use homogeneously structured elastomers or those with a shell structure. The shell-type structure is determined by the sequence of addition of the individual monomers. The morphology of the polymers is also affected by this sequence of addition.

Monomers which may be mentioned here, merely as examples, for the production of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell made from a rubber phase.

If one or more hard components (with glass transition temperatures above 20° C.) are also involved, besides the rubber phase, in the structure of the elastomer, these are generally produced by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers here.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

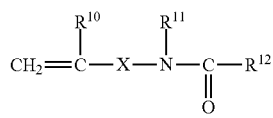

where the definitions of the substituents can be as follows:
$R^{10}$ hydrogen or a $C_1$-$C_4$-alkyl group,
$R^{11}$ hydrogen or a $C_1$-$C_8$-alkyl group or an aryl group, in particular phenyl,
$R^{12}$ hydrogen, a $C_1$-$C_{10}$-alkyl group, a $C_6$-$C_{12}$-aryl group, or —$OR^{13}$
$R^{13}$ a $C_1$-$C_8$-alkyl group or a $C_6$-$C_{12}$-aryl group, optionally with substitution by O- or N-containing groups,
X a chemical bond or a $C_1$-$C_{10}$-alkylene group, or a $C_6$-$C_{12}$-arylene group, or

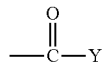

Y O—Z or NH—Z, and
Z a $C_1$-$C_{10}$-alkylene group or a $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)-ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope made of monomers as described under I and II for the core, second envelope as described under I or IV for the envelope |

These graft polymers, in particular ABS polymers and/or ASA polymers, are preferably used in amounts of up to 40% by weight for impact-modification of PBT, optionally in a mixture with up to 40% by weight of polyethylene terephthalate. Appropriate blend products are obtainable with trademark Ultradur® S (previously Ultrablend® S) from BASF AG.

Instead of graft polymers whose structure has more than one shell, it is also possible to use homogeneous, i.e. single-shell, elastomers made from 1,3-butadiene, isoprene and n-butyl acrylate or from copolymers of these. These products, too, may be produced by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer envelope made from the abovementioned copolymers, and copolymers of ethylene with comonomers which supply reactive groups.

The elastomers described can also be produced by other conventional processes, e.g. via suspension polymerization.

Preference is likewise given to silicone rubbers, as described in DE-A 37 25 576, EP-A 235 690, DE-A 38 00 603 and EP-A 319 290.

Of course it is also possible to use a mixture of the types of rubber listed above.

Fibrous or particulate fillers C) that may be mentioned are glass fibers, glass beads, amorphous silica, asbestos, calcium silicate, calcium metasilicate, magnesium carbonate, kaolin, chalk, powdered quartz, mica, barium sulfate, and feldspar. The amounts used of fibrous fillers C) are up to 60% by weight, in particular up to 35% by weight, and the amounts used of particulate fillers are up to 30% by weight, in particular up to 10% by weight.

Preferred fibrous fillers that may be mentioned are aramid fibers and potassium titanate fibers, and particular preference is given here to glass fibers in the form of E glass. These can be used in the form of rovings or of chopped glass in the forms commercially obtainable.

The amounts used of fillers that have high laser absorbency, for example carbon fibers, carbon black, graphite, graphene, or carbon nanotubes, are preferably below 1% by weight, particularly preferably below 0.05% by weight.

The fibrous fillers can have been surface-pretreated with a silane compound in order to improve compatibility with the thermoplastic.

Suitable silane compounds are those of the general formula

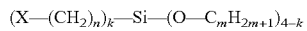

where the definitions of the substituents are as follows:

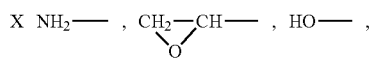

n is an integer from 2 to 10, preferably from 3 to 4
m is an integer from 1 to 5, preferably from 1 to 2
k is an integer from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used of the silane compounds for surface coating are from 0.05 to 5% by weight, preferably from 0.1 to 1.5% by weight, and in particular from 0.2 to 0.5% by weight (based on C).

Acicular mineral fillers are also suitable.

For the purposes of the invention, acicular mineral fillers are a mineral filler with very pronounced acicular character. An example that may be mentioned is acicular wollastonite. The L/D (length to diameter) ratio of the mineral is preferably from 8:1 to 35:1, with preference from 8:1 to 11:1. The mineral filler can optionally have been pretreated with the abovementioned silane compounds; however, the pretreatment is not essential.

The thermoplastic molding compositions of the invention can comprise, as component C), conventional processing aids, such as stabilizers, oxidation retarders, agents to counteract decomposition by heat and decomposition by ultraviolet light, lubricants and mold-release agents, colorants, such as dyes and pigments, plasticizers, etc.

Examples of oxidation retarders and heat stabilizers are sterically hindered phenols and/or phosphites, hydroquinones, aromatic secondary amines, such as diphenylamines, and various substituted representatives of these groups, and mixtures of these, at concentrations of up to 1% by weight, based on the weight of the thermoplastic molding compositions.

UV stabilizers that may be mentioned, generally used in amounts of up to 2% by weight, based on the molding composition, are various substituted resorcinols, salicylates, benzotriazoles, and benzophenones.

Colorants that can be added comprise inorganic and organic pigments, and also dyes, such as nigrosin, and anthraquinones. Particularly suitable colorants are mentioned by way of example in EP 1722984 B1, EP 1353986 B1, or DE 10054859 A1.

Preference is further given to esters or amides of saturated or unsaturated aliphatic carboxylic acids having from 10 to 40, preferably from 16 to 22, carbon atoms with saturated aliphatic alcohols or amines which comprise from 2 to 40, preferably from 2 to 6, carbon atoms.

The carboxylic acids can be monobasic or dibasic. Examples that may be mentioned are pelargonic acid, palmitic acid, lauric acid, margaric acid, dodecanedioic acid, behenic acid, and with particular preference stearic acid, and capric acid, and also montanic acid (a mixture of fatty acids having from 30 to 40 carbon atoms).

The aliphatic alcohols can be mono- to tetrahydric. Examples of alcohols are n-butanol, n-octanol, stearyl alcohol, ethylene glycol, propylene glycol, neopentyl glycol, and pentaerythritol, preference being given here to glycerol and pentaerythritol.

The aliphatic amines can be mono- to trifunctional. Examples of these are stearylamine, ethylenediamine, propylenediamine, hexamethylenediamine, and di(6-aminohexyl)amine, particular preference being given here to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or esters combined with amides, in any desired mixing ratio.

The amounts used of further lubricants and mold-release agents are usually up to 1% by weight. It is preferable to use long-chain fatty acids (e.g. stearic acid or behenic acid), salts of these (e.g. Ca stearate or Zn stearate), or montan waxes (mixtures made of straight-chain, saturated carboxylic acids having chain lengths of from 28 to 32 carbon atoms), or else Ca montanate or Na montanate, or else low-molecular-weight polyethylene waxes or low-molecular-weight polypropylene waxes.

Examples that may be mentioned of plasticizers are dioctyl phthalate, dibenzyl phthalate, butyl benzyl phthalate, hydrocarbon oils, and N-(n-butyl)benzenesulfonamide.

The molding compositions of the invention can also comprise from 0 to 2% by weight of fluorine-containing ethylene polymers. These are polymers of ethylene having fluorine content of from 55 to 76% by weight, preferably from 70 to 76% by weight.

Examples here are polytetrafluoroethylene (PTFE), tetrafluoroethylene-hexafluoropropylene copolymers, or tetrafluoroethylene copolymers having relatively small proportions (generally up to 50% by weight) of copolymerizable ethylenically unsaturated monomers. These are described by way of example by Schildknecht in "Vinyl and Related Polymers", Wiley-Verlag, 1952, pages 484 to 494, and by Wall in "Fluorpolymers" (Wiley Interscience, 1972).

These fluorine-containing ethylene polymers have homogeneous distribution in the molding compositions and preferably have a (number-average) $d_{50}$ particle size in the range from 0.05 to 10 μm, in particular from 0.1 to 5 μm. These small particle sizes can be particularly preferably achieved via use of aqueous dispersions of fluorine-containing ethylene polymers and incorporation of these into a polyester melt.

The thermoplastic molding compositions of the invention can be produced by processes known per se, by mixing the starting components in conventional mixing apparatuses, such as screw extruders, Brabender mixers, or Banbury mixers, and then extruding the same. The extrudate can be cooled and comminuted. It is also possible to premix individual components (e.g. applying component B) to the pellets, for example in a drum), then add the remaining starting materials individually and/or after they have been likewise mixed. The mixing temperatures are generally from 230 to 290° C. Component B) can also preferably be added to the extruder inlet by the hot-feed or direct method.

In another preferred method of operation, components B) and also optionally C) can be mixed with a polyester prepolymer, and compounded and pelletized. The resultant pellets are then solid-phase condensed under inert gas continuously or batchwise at a temperature below the melting point of component A) until the desired viscosity has been reached.

In another preferred production method, a masterbatch (concentrate) is first produced from A) and B), where the amount of component B incorporated into A) (based on A)+B)) is up to 20% by weight, preferably up to 10% by weight. Said concentrate in the form of pellets is fed into the polyester (without additional substances) during the production of the tube extrudates or profile extrudates, or is premixed in the corresponding quantitative proportion, e.g. in a tumbling mixer, and the mixture is then compounded and extruded in the form of moldings.

The molding compositions or moldings of the invention exhibit reduced TOC emission which is preferably less than or equal to 100 ppm, in particular less than or equal to 80 ppm, and very particularly preferably less than or equal to 65 ppm (in accordance with VDA 277).

Examples of applications and moldings are:

Moldings: thermoformed or injection-molded cavities and moldings

Cosmetics packaging: lipsticks and makeup sticks, packaging for skin creams, hair-care products, and dental care products.

Packaging for medicaments, injectors, syringes, thermoformed packaging for tablets.

Food-and-drink packaging: coffee capsules, ready meals, packaging suitable for hot filling and sterilization (meat products, jams, milk products, etc.), optionally with multiple use.

Components in contact with drinking water, e.g. constituents of household plumbing systems Articles necessary for contact with food or drink, e.g. cutlery, turners, etc.

Components of kitchen machines in contact with food or drink, e.g. water-carrying parts of coffee machines (brewing units), juicers, etc.

Automobile interior: kinematic systems

EXAMPLES

The following components were used.
Component A
Polybutylene terephthalate (PBT) with MVR 106.7 cm$^3$/g 10 min. (in accordance with ISO 1133 for 250° C/2.16 kg) and IV 88.4 ml/g (in accordance with ISO 1628).
Residual titanium content was 100 ppm.
Component B/1
Polyacrylic acid with average molar mass ($M_w$) 5000 g/mol (by GPC) in the form of 49% aqueous solution (Sokalan® PA 25 XS from BASF SE)
 pH: 2
 Viscosity: 500 mPas
Component B/2
Polyacrylic acid-maleic anhydride copolymer in the form of 50% solution (Sokalan® CP 10 S from BASF SE)
 $M_w$: 4000 g/mol
 pH: 1.5
 Viscosity: 150 mPas
Component B/1V
 Sodium hypophosphite Component B/2V
Epoxy-functionalized styrene/acrylic acid polymer (Joncryl® ADR-4368)
Component C
Pentaerythritol tetrastearate All of the B1/B2 molar masses were determined by means of GPC. The GPC conditions used are as follows: 2 columns (Suprema Linear M) and one pre-column (Suprema pre-column), all using Suprema Gel (HEMA) products from Polymer Standard Services (Mainz, Germany), were operated at 35° C. with flow rate 0.8 ml/min. Eluent used comprised the aqueous solution buffered at pH 7 by TRIS, admixed with 0.15M NaCl and 0.01M NaN$_3$. Calibration was achieved with a Na-PAA standard of which the cumulative molar mass distribution curve had been determined by combined SEC/laser light scattering, by the calibration method of M. J. R. Cantow et al. (J. Polym. Sci., A-1.5 (1967) 1391-1394), but without the concentration correction proposed in that reference. All of the specimens were adjusted to pH 7 with 50% by weight aqueous sodium hydroxide solution. A portion of the solution was diluted with deionized water to 1.5 mg/ml solids content and stirred for 12 hours. The specimens were then filtered, and 100 μl were injected through a Sartorius Minisart RC (0.2 μm).

Component A was extruded with various additives in a twin-screw extruder at melt temperature from 265 to 275° C., throughput 5 kg/h, and rotational rate 300 min$^-$. The additives (in aqueous solution) were metered with the pellets in the cold-feed system. The percentages by weight stated in the table relate to undiluted additive B without solvent.

The extruded material was then injection-molded to give plaques measuring 60×60×0.5 mm.
Quantitative Emission Analysis:

Quantitative emission analysis was carried out in accordance with VDA 277, a standard method of the Automobile Industry Association for the determination of TOC (=total organic carbon emission). VDA 277 is used to investigate the carbon emission of nonmetallic materials used in motor vehicles. In this method, the injection-molded plaques, or the pellets after packaging, are comminuted and charged to a glass vessel, which is sealed. The specimen is then stored at 120° C. for 5 hours. The gas volume above the specimen is then analyzed in the gas chromatograph (headspace GC). Emission is determined here in μg of carbon (TOC) per gram of specimen.

The tables show the constitutions of the molding compositions and the results of the measurements.

TABLE 1a

|   | Comp/1 [% by wt.] | Comparative example 2 [% by wt.] | Inventive example 1 [% by wt.] | Inventive example 2 [% by wt.] |
|---|---|---|---|---|
| A | 99.35 | 98.85 | 99.05 | 98.85 |
| C | 0.65 | 0.65 | 0.65 | 0.65 |
| B/1V | — | 0.5 | — | — |
| B/1 | — | — | 0.3 | — |
| B/2 | — | — | — | 0.5 |

TABLE 1b

| Composition | TOC[1] in accordance with VDA 277 [ppm] | TOC[2] [ppm] | IV [ml/g] |
|---|---|---|---|
| Comp/1 | 239 | — | — |
| Comp/2 | 128 | — | — |

TABLE 1b-continued

| Composition | TOC[1] in accordance with VDA 277 [ppm] | TOC[2] [ppm] | IV [ml/g] |
|---|---|---|---|
| Inventive example 1 | 46 | — | 87 |
| Inventive example 2 | 54 | 19 | 88 |

[1] on the sample
[2] on the pellets

TABLE 2

| | Composition [% by weight] | | | |
|---|---|---|---|---|
| | Comp 3 | Comp 4 | Comp 5 | Comp 6 |
| A | 100 | 99.8 | 99.5 | 98 |
| B/2V | — | 0.2 | 0.5 | 2 |
| TOC[2] [ppm] | 114 | 74 | 71 | 98 |
| IV [ml/g] | 89 | 91 | 99 | 115 |

The invention claimed is:

1. A thermoplastic molding composition having a TOC emission less than or equal to 100 ppm (in accordance with VDA 277), wherein the thermoplastic molding composition comprises
   A) from 30 to 99.99% by weight of a polyester composed of from 50 to 100% by weight of at least one polyalkylene terephthalate A1), based on A), and from 0 to 50% by weight of a polyester A2), differing from A1),
   B) from 0.01 to 2% by weight of an acrylic acid polymer, composed of
   B1) from 70 to 100% by weight of acrylic acid,
   B2) from 0 to 30% by weight of at least one other ethylenically unsaturated monomer copolymerizable with acrylic acid, selected from the group of monoethylenically unsaturated carboxylic acids, and
   C) from 0 to 70% by weight of other additional substances,
   where the total of the percentages by weight of components A) to C) is 100%,
   and wherein polyester A2) is selected from the group consisting of an aromatic polyester, a copolyetherester, and a halogen-free polycarbonate.

2. The thermoplastic molding composition according to claim 1, where a pH of component B) is less than 4.

3. The thermoplastic molding composition according to claim 1, where an average molar mass $M_w$ of component B) is from 1000 to 12,000 g/mol.

4. The thermoplastic molding composition according to claim 1, where component B) is composed of
   B1) from 85 to 100% by weight of acrylic acid, and
   B2) from 0 to 15% by weight of the copolymerizable monomer according to claim 1.

5. The thermoplastic molding composition according to claim 1, in which the comonomer is selected from the group consisting of methacrylic acid, maleic acid, fumaric acid, citraconic acid, mesaconic acid, and mixtures thereof.

6. A fiber, a foil, or a molding comprising a thermoplastic molding composition having a TOC emission less than or equal to 100 ppm (in accordance with VDA 277), wherein the thermoplastic molding composition comprises
   A) from 30 to 99.99% by weight of a polyester composed of from 50 to 100% by weight of at least one polyalkylene terephthalate A1), based on A), and from 0 to 50% by weight of a polyester A2), differing from A1),
   B) from 0.01 to 2% by weight of an acrylic acid polymer, composed of
   B1) from 70 to 100% by weight of acrylic acid,
   B2) from 0 to 30% by weight of at least one other ethylenically unsaturated monomer copolymerizable with acrylic acid, selected from the group of monoethylenically unsaturated carboxylic acids, and
   C) from 0 to 70% by weight of other additional substances,
   where the total of the percentages by weight of components A) to C) is 100%,
   and wherein polyester A2) is selected from the group consisting of an aromatic polyester, a copolyetherester, and a halogen-free polycarbonate.

7. The fiber, foil, or molding according to claim 6 designed for use with food or drink, cosmetics products, medicaments, drinking-water applications, in motor-vehicle interiors, or for kinematic systems.

8. A method of producing a fiber, foil, or molding comprising providing a thermoplastic molding composition, and forming the thermoplastic molding composition into a fiber, foil, or molding, wherein the thermoplastic molding composition comprises
   A) from 30 to 99.99% by weight of a polyester composed of from 50 to 100% by weight of at least one polyalkylene terephthalate A1), based on A), and from 0 to 50% by weight of a polyester A2), differing from A1),
   B) from 0.01 to 2% by weight of an acrylic acid polymer, composed of
   B1) from 70 to 100% by weight of acrylic acid,
   B2) from 0 to 30% by weight of at least one other ethylenically unsaturated monomer copolymerizable with acrylic acid, selected from the group of monoethylenically unsaturated carboxylic acids, and
   C) from 0 to 70% by weight of other additional substances,
   where the total of the percentages by weight of components A) to C) is 100%,
   and wherein polyester A2) is selected from the group consisting of an aromatic polyester, a copolyetherester, and a halogen-free polycarbonate.

9. The method of claim 8 wherein the thermoplastic molding composition is formed by extrusion.

10. The fiber, foil, or molding according to claim 6, where a pH of component B) is less than 4.

11. The fiber, foil, or molding according to claim 6, where an average molar mass $M_w$ of component B) is from 1000 to 12,000 g/mol.

12. The fiber, foil, or molding according to claim 6, where component B) is composed of
   B1) from 85 to 100% by weight of acrylic acid, and
   B2) from 0 to 15% by weight of the copolymerizable monomer according to claim 6.

13. The fiber, foil, or molding according to claim 6, in which the comonomer is selected from the group consisting of methacrylic acid, maleic acid, fumaric acid, citraconic acid, mesaconic acid, and mixtures thereof.

14. The method according to claim 8, where a pH of component B) is less than 4.

15. The method according to claim 8, where an average molar mass $M_w$ of component B) is from 1000 to 12,000 g/mol.

16. The method according to claim 8, where component B) is composed of
   B1) from 85 to 100% by weight of acrylic acid, and
   B2) from 0 to 15% by weight of the copolymerizable monomer according to claim 8.

17. The method according to claim 8, in which the comonomer is selected from the group consisting of methacrylic acid, maleic acid, fumaric acid, citraconic acid, mesaconic acid, and mixtures thereof.

* * * * *